(12) United States Patent
Arun

(10) Patent No.: US 7,634,095 B2
(45) Date of Patent: Dec. 15, 2009

(54) DYNAMIC TUNING OF HANDS-FREE ALGORITHM FOR NOISE AND DRIVING CONDITIONS

(75) Inventor: Uma Arun, Novi, MI (US)

(73) Assignee: General Motors Company, Detroit, MI (US)

(*) Notice: Subject to any disclaimer, the term of this patent is extended or adjusted under 35 U.S.C. 154(b) by 1073 days.

(21) Appl. No.: 10/784,569

(22) Filed: Feb. 23, 2004

(65) Prior Publication Data

US 2005/0187763 A1   Aug. 25, 2005

(51) Int. Cl.
*H04B 1/00* (2006.01)
*H03B 29/00* (2006.01)
*H03G 3/20* (2006.01)
*H03G 3/00* (2006.01)
*H04B 1/06* (2006.01)

(52) U.S. Cl. ............... 381/86; 381/71.4; 381/57; 381/109; 455/238.1

(58) Field of Classification Search ............ 381/57, 381/107, 71.4; 455/238.1
See application file for complete search history.

(56) References Cited

U.S. PATENT DOCUMENTS

| 4,641,344 | A | * | 2/1987 | Kasai et al. ............... 381/57 |
| 5,850,458 | A | * | 12/1998 | Tomisawa et al. ........ 381/71.4 |
| 5,872,852 | A | * | 2/1999 | Dougherty ............... 381/57 |
| 6,154,666 | A | * | 11/2000 | Patterson et al. ........ 381/57 |
| 6,674,865 | B1 | * | 1/2004 | Venkatesh et al. ........ 381/107 |
| 6,898,501 | B2 | * | 5/2005 | Schubert ............... 701/50 |
| 2002/0097884 | A1 | * | 7/2002 | Cairns ............... 381/71.4 |
| 2004/0086135 | A1 | * | 5/2004 | Vaishya ............... 381/71.4 |
| 2004/0142672 | A1 | * | 7/2004 | Stankewitz ............ 455/296 |
| 2005/0130723 | A1 | * | 6/2005 | Grivas et al. ........... 455/575.9 |

* cited by examiner

*Primary Examiner*—Devona E Faulk

(57) ABSTRACT

A method of tuning a hands-free system in a mobile vehicle, the method including receiving a plurality of vehicle condition inputs, creating a noise parameter based on the vehicle condition inputs and adjusting a noise suppression algorithm of the hands-free system based on the created noise parameter.

6 Claims, 8 Drawing Sheets

DYNAMIC TUNING OF HANDS-FREE ALGORITHM FOR NOISE AND DRIVING CONDITIONS

FIELD OF THE INVENTION

This invention relates generally to hands-free algorithm for server based speech recognition. In particular this invention relates to tuning the noise reduction algorithm of a hands-free algorithm for a server based speech recognition system.

BACKGROUND OF THE INVENTION

The opportunity to personalize features in a mobile vehicle is ever increasing as the automobile is being transformed into a communications and entertainment platform as well as a transportation platform. Current projections indicate that some type of telematics unit to provide wireless communication and location-based services will be installed in a majority of new American cars in the near future. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

The speech recognition system within a telematics system operates on speech spoken from inside a vehicle, often with a changing ambient environment. When the speech recognition system is triggered to initiate human-to-human communication or human-to-machine communication over an embedded or in-vehicle phone an application in the speech recognition system will trigger the hands-free system in the phone. The hands-free system has a noise reduction algorithm to provide capability to reduce ambient noise. In some cases the spoken word is received at the microphone along with ambient noise. Some noise suppression technologies use the received ambient noise to form an ambient noise parameter. The formed ambient noise parameter is used to modify the received signal and ambient noise input in a hands-free algorithm within the speech recognition system.

There are various conditions that will change the ambient noise level within a vehicle. These conditions include the speed of the vehicle, the level of the fan to control the internal environment of the vehicle, audio-devices in the vehicle, beeps and chimes related to turn signaling and seatbelt, the weather in which the vehicle is traveling, and the type of road the vehicle is on and the condition of the road. For example, a dry highway has a different noise level within a vehicle than a wet highway or a muddy dirt road. If a user of a telematics system is speaking to a hands-free system while the background noise is changing, the hands-free algorithm needs to adapt as efficiently as possible to remove the various changing ambient noises. This helps the person listening to the phone at the other end of the communication system channel to recognize the spoken words over the changing ambient noise. If the phone call is directed to a machine, for example, in a telematics-unit access system at a call center, the speech recognition system of the machine will recognize the words.

It is desirable to tune a hands-free system to the changing vehicular environmental conditions based on feedback other than the received ambient signal. It is desirable to add data, which is based on the physical environment in which the vehicle is being driven and the physical environment inside the vehicle passenger compartment and the physical environment of the vehicle engine to the noise received along with the spoken words.

SUMMARY OF THE INVENTION

One aspect of the present invention provides a method of tuning a hands-free system in a vehicle. The method includes receiving a plurality of vehicle condition inputs, creating a noise parameter based on the vehicle condition inputs and adjusting a noise suppression algorithm of the speech recognition system based on the created noise parameter.

Another aspect of the present invention provides a system having means for tuning of a hands-free system in a vehicle. The system includes means for receiving a plurality of vehicle condition inputs, means for creating a noise parameter based on the vehicle condition inputs and means for adjusting a noise suppression algorithm of the hands-free system based on the created noise parameter.

A third aspect of the present invention provides a computer readable medium storing a computer program including computer readable code for receiving a plurality of vehicle condition inputs, computer readable code for creating a noise parameter based on the vehicle condition inputs, and computer readable code for adjusting a noise suppression algorithm of the speech recognition system based on the created noise parameter.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
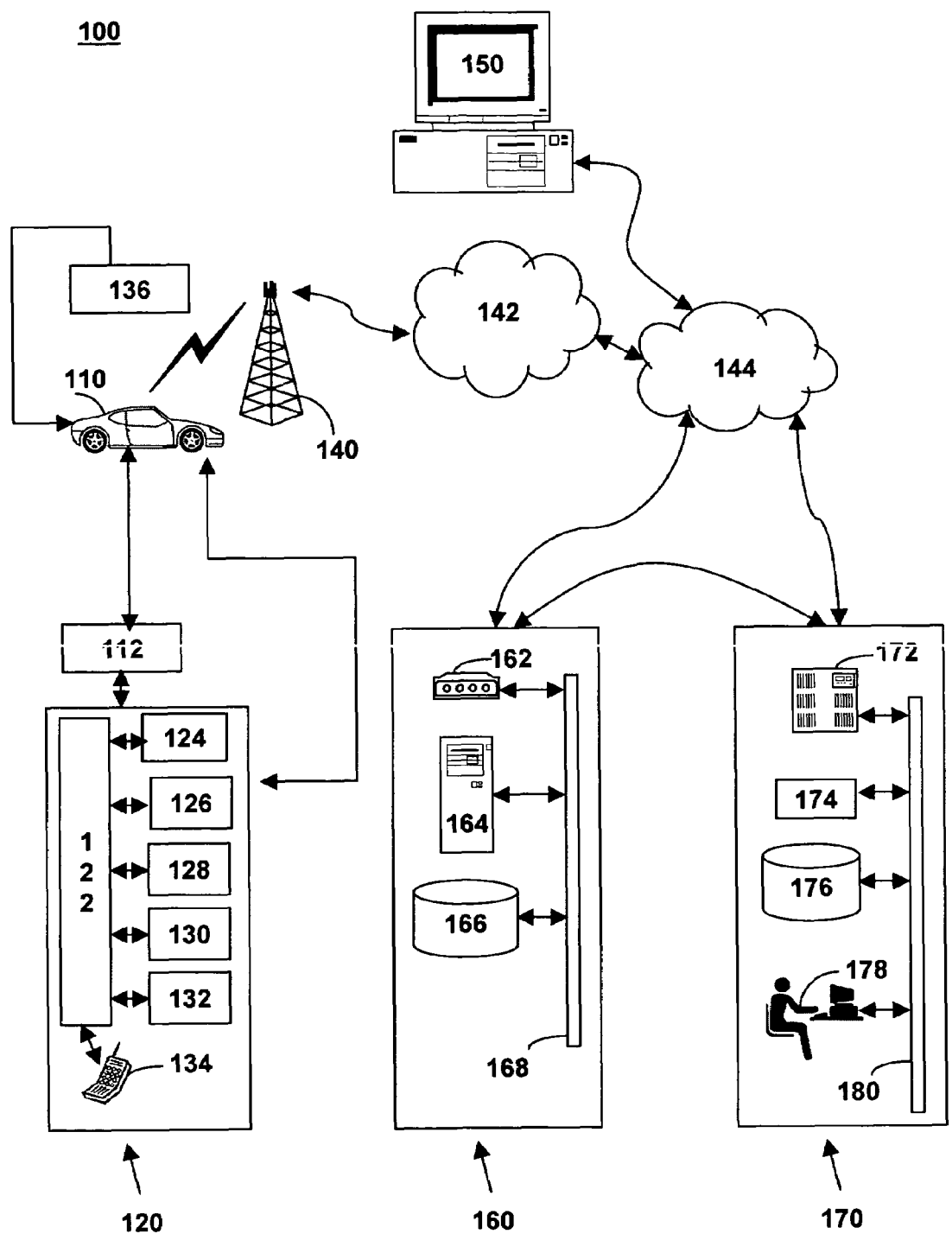
FIG. 1 is a schematic diagram of a system for providing access to a telematics unit in a mobile vehicle.

FIG. 1 illustrates one embodiment of a system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example GPS unit 126 or speakers 132. Telematics unit 120 may include additional components not relevant to the present discussion.

In one embodiment, DSP 122 is implemented as a microcontroller, microprocessor, controller, host processor, or vehicle communications processor. In an example, DSP 122 is implemented as an application specific integrated circuit (ASIC). In another embodiment, DSP 122 is implemented as a processor working in conjunction with a central processing unit (CPU) performing the function of a general purpose processor. GPS unit 126 provides longitude and latitude coordinates of the vehicle responsive to a GPS broadcast signal received from a one or more GPS satellite broadcast systems (not shown). In-vehicle mobile phone 134 is a cellular-type phone, such as, for example an analog, digital, dual-mode, dual-band, multi-mode or multi-band cellular phone.

DSP 122 executes various computer programs that affect programming and operational modes of electronic and mechanical systems within MVCU 110. DSP 122 controls communications (e.g. call signals) between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from DSP 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes compute, applications and files for managing and storing personalization setting supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located ir, the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmission from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions. Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
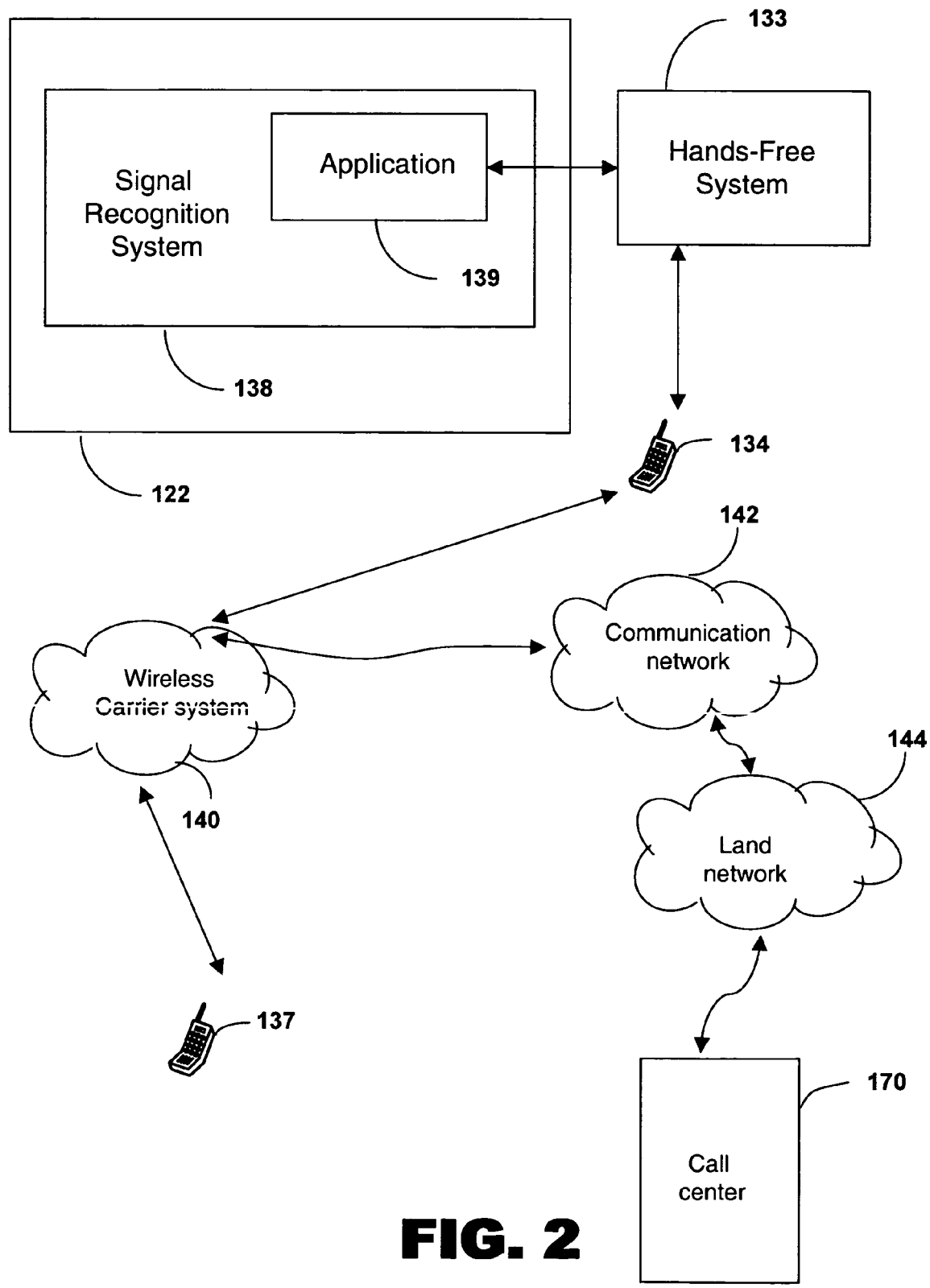
FIG. 2 is a schematic diagram of a hands-free system within a communication system.

FIG. 2 is a schematic diagram of the in-vehicle phone 134 hands-free system 133 in communication with the system comprising one or more wireless carrier system 140, the communication network 142 and land network 144. Speech recognition system 138 comprises a speech recognition application 139, which is installed in DSP 122 to translate human voice input through microphone 130 to digital signals. For example, the capability to program in-vehicle phone 134 may be controlled with verbal commands that are translated by speech recognition software executed by DSP 122.

In some cases the speech recognition application 139 receives a command to initiate a call over the communications network, comprising at least one of the wireless carrier system 140, the communication network 142 and land network 144. In that case, a noise reduction algorithm in the hands-free system 133 within the in-vehicle phone 134 will operate to reduce the ambient noise in the transmitted digital signals. The initiated call may be directed to a user of another phone 137 or a machine or human at the call center 170.

The flowcharts 400, 500, 600, 700 and 800 describe a method of using sensors 136 to sense various external vehicle conditions and internal vehicle conditions of MVCU 110, which has a telematics unit 120. In one embodiment the sensed external vehicle conditions are combined and transmitted to the hands-free system 133. In another embodiment, the sensed external vehicle conditions are transmitted to the hands-free system 133 and combined by the hands-free system 133. In one embodiment, the sensed internal vehicle conditions are combined and transmitted to the hands-free system 133. In another embodiment, the sensed internal vehicle conditions are transmitted to the hands-free system 133 and combined by the hands-free system 133. A noise parameter based on the vehicle condition inputs, both internal and external, is created and used to adjust a noise suppression algorithm of the hands free system based on the created noise parameter.

Figure 3:
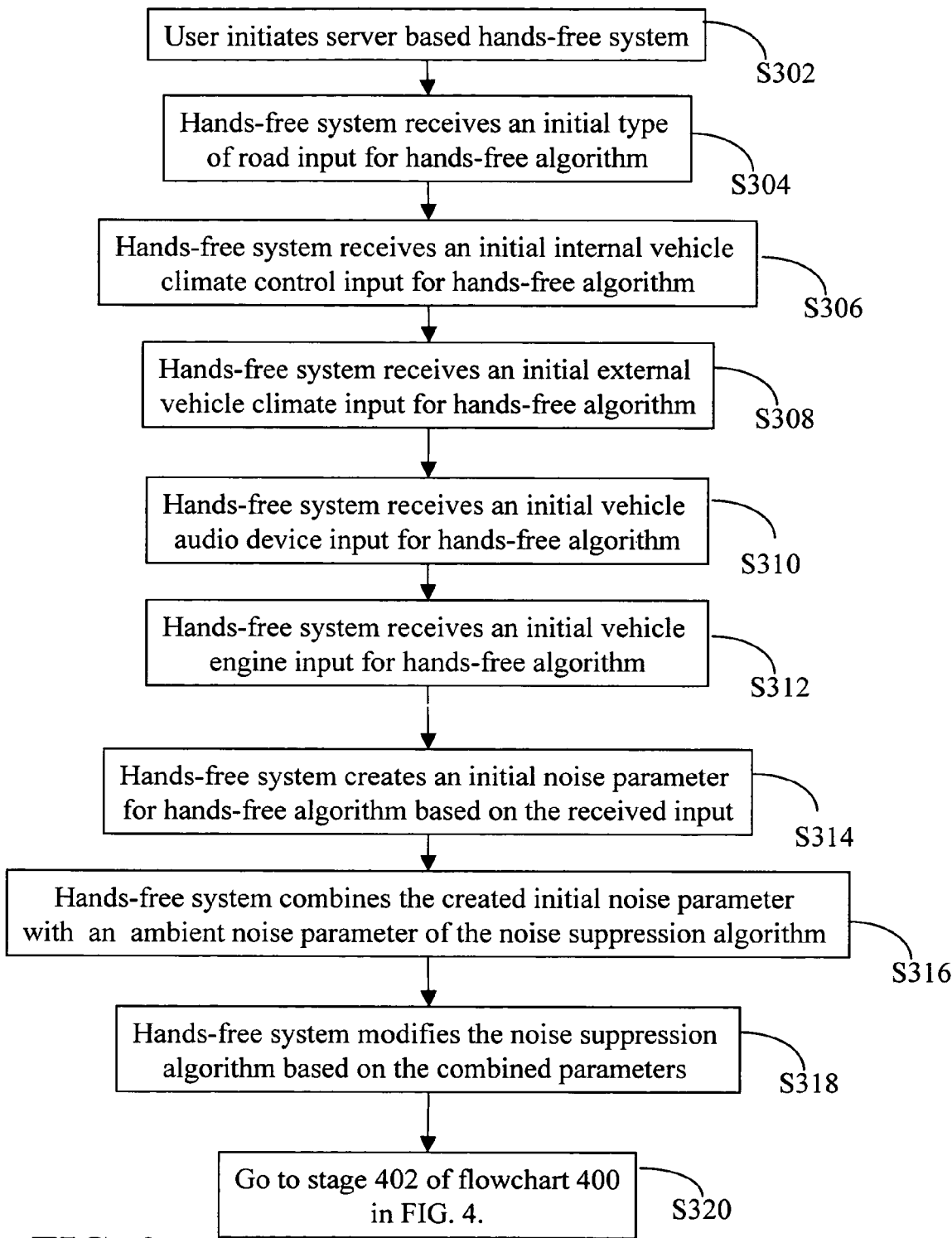
FIG. 3 illustrates a flowchart representative of initializing a noise parameter and modifying a noise suppression algorithm in accordance with the present invention.

FIG. 3 illustrates a flowchart 300 representative of initializing a noise parameter and modifying a noise suppression algorithm in accordance with the present invention. During stage S310, the user initiates the server based voice recognition system 138 installed in DSP 122 by speaking a word or phrase into the microphone 130. The speech recognition application 139 receives a command to initiate a call over the communications network, comprising at least one of the wireless carrier system 140, the communication network 142 and land network 144. A hands-free system 133 within the in-vehicle phone 134 is initiated by the speech recognition application 139 in response to the command to initiate a call over the communications network.

During stage S304, the hands-free system 133 receives initial type of road input for the hands-free algorithm. During this stage the MVCU 110 sends the global positioning coordinates of MVCU 110 to the communication server database 176 over communication channel comprised of at least wireless carrier system 140, communication network 142 and land network 144. The communication server database 176 in the call center 120 has geographic information system software, which determines on which type of surface the MVCU 110 is traveling. For example, MVCU 110 can be on a paved road, street or highway or it can be on a dirt road. The geographic information system software assigns a type of road input parameter based on the determined type of surface. The communication server database 176 transmits the type of road input parameter to the hands-free system 133. The type of road input parameter is transmitted from the call center 170 to the telematics unit 120 over a communication channel comprised of at least wireless carrier system 140, communication network 142 and land network 144. In one embodiment of the present invention the received type of road input parameter is stored in a memory within the hands-free system 133. In other embodiments of the present invention the received type of road input parameter is stored in the memory 128. In another embodiment, the telematics unit 120 contains geographic information software that determines the type of surface the MCVU 110 is traveling.

During stage S306, the hands-free system 133 receives an initial internal vehicle climate control input for the hands-free algorithm. The MVCU 110 has climate controls, which include fans for the air conditioning or heating systems. The level at which the fans are run will affect the background noise level. The vehicle climate control input parameter is formed by determining the drive level of each of the fans in the MVCU 110 and using an algorithm to establish the combined noise level from all fans at the microphone 130. In one embodiment of the present invention, the drive levels of the fans are input as several signals to the hands-free system 133 where a combined internal vehicle climate control input parameter is generated. In other embodiments of the present invention, the input signal from several fans is combined into one internal vehicle climate control input parameter using software within a vehicle climate control panel before the signal is transmitted through the vehicle communication bus 112 to the hands-free system 133 within the in-vehicle phone 134.

In one embodiment of the present invention the received internal vehicle climate control input parameter is stored in a memory within the hands-free system 133. In another embodiment of the present invention the received internal vehicle climate control input parameter is also stored in the memory 128.

During stage S308, the hands-free system 133 receives an initial external vehicle climate input for the hands-free algorithm. The MVCU 110 has various sensors 136 to sense the weather and external conditions in which the MVCU 110 is located. For example, a sensor 136 recognizes if it is raining and a wind sensor 136 can detect the wind level. The DSP 122 can calculate the wind level direction after subtracting the wind induced by the MVCU 110 speed, which is also known as will be discussed in stage S316. All external sensors 136 are indicated as sensor in FIG. 1. The external sensor 136 input is transmitted through the vehicle communication bus 112 to the speech recognition application 139 of DSP 122. The speech recognition application 139 transmits the external vehicle climate input to the hands-free system 133.

In one embodiment of the present invention, the external vehicle climate input comprises several signals from several sensors 136, which are each transmitted to the hands-free system 133. The hands-free system 133 combines the external vehicle climate control input parameters into one external vehicle climate control input value. In one embodiment of the present invention, the several external vehicle climate inputs are combined into one external vehicle climate control by software embedded in the MVCU 110 input value before the signal is transmitted through the vehicle communication bus 112 to the hands-free system 133.

In one embodiment of the present invention the received external vehicle climate input parameter is stored in a memory within the hands-free system 133. In another embodiment of the present invention the received external vehicle climate input parameter is also stored in the memory 128 of telematics unit 120.

During stage S310, the hands-free system 133 receives an initial vehicle audio-device input for the hands-free algorithm. The MVCU 110 has various audio-devices that create ambient noise at different times and at different intensities. An audio-device sensor 136 is correlated to each of the audio-devices in MVCU 110. The audio-device sensors 136 are indicated as sensor 136 in FIG. 1. Some of the ambient noises created by these audio-devices are periodic, such as the sound of a turn indicator. The audio-devices include, but are not limited to, radios, compact disc players, digital video disc players, MP3 players, turn signal indicators, seat belt-off indicators and other devices which produce sound in the MVCU 110. The sensor 136 will transmit a signal with input about the type and intensity level of the ambient noise being generated by the audio-devices through the vehicle communication bus 112 to the speech recognition application 139 of DSP 122. The speech recognition application 139 transmits the vehicle audio-device input to the hands-free system 133.

In one embodiment of the present invention, several sensors 136 input several signals to the hands-free system 133 where a combined initial vehicle audio-device input parameter is generated. In another embodiment of the present invention, the input of several sensors 136 is combined into a single vehicle audio-device input parameter by software embedded with the sensors before the signal is transmitted through the vehicle communication bus 112 to the hands-free system 133.

In one embodiment of the present invention the received vehicle audio-device input parameter is stored in a memory within the hands-free system 133. In another embodiment of the present invention the received vehicle audio-device input parameter is stored in the memory 128 of telematics unit 120.

During stage S312 the hands-free system 133 receives an initial vehicle engine input for the hands-free algorithm- The vehicle engine input parameter will provide information about the rotation rates of various parts of the engine. The rotation rare of the tires is included in this input parameter. The tire rotation allows the algorithm to calculate the speed of the MVCU 110 and the expected noise level in the MVCU 110 due to the flow of air in and around the MVCU 110. In one embodiment of this invention, the state of the vehicle windows, for example, open, closed or percent open, is included in the noise parameter. When the windows are open, the noise will increase by a factor, which depends upon the speed of the MVCU 110. The algorithm will calculate the audio level in the vehicle based on which windows are open and by how much. The vehicle engine input parameter from one or more sensors 136 in the vehicle engine or the body of the MVCU 110 will be transmitted through the vehicle communication bus 112 to the speech recognition application 139 of DSP 122. The speech recognition application 139 transmits the vehicle engine input to the hands free system 133.

In one embodiment of the present invention, several sensors 136 input several signals to the hands-free system 133 where a combined vehicle engine input parameter is generated. In another embodiment of the present invention, the input of several sensors 136 is combined into a single vehicle engine input parameter before the signals is transmitted through the vehicle communication bus 112 to the hands-free system 133.

In one embodiment of the present invention the received vehicle engine input parameter is stored in a memory within the hands-free system 133. In other embodiments of the present invention the received vehicle engine input parameter is also stored in the memory 128.

The order of the receipt of input parameters for the hands-free algorithm as described for stages S304 through S312 are not limited to this described order of receipt of input. In one embodiment of the present invention one or more of the stages S306 to S312 is not included in the flow.

During stage S314, the hands-free system 133 creates an initial noise parameter for hands-free algorithm based on the received inputs from stages S306 to S312. The received input data includes, but is not limited to, one or more of a type of road input, an external vehicle climate control input, an external vehicle climate input, a vehicle audio-device input, a vehicle engine input. In one embodiment, the hands-free system 133 comprises a micro-processor and a memory. The hands-free system 133 performs the required operations on the input data to form a noise parameter.

During stage S316, the hands-free system 133 combines the created initial noise parameter during stage S314 with an ambient noise parameter of the noise suppression algorithm. The noise suppression algorithm in some technologies receives an audio input signal comprising the words and ambient noise and generates an ambient noise parameter. There are several methods of generating an ambient noise parameter as is known to those of ordinary skill in the art. The manner in which the noise parameters are combined depends upon the manner in which the ambient noise parameter is formed.

During stage S318, the hands-free system 133 modifies the noise suppression algorithm based on the combined created noise parameter and the ambient noise parameter. The method of modifying the noise suppression algorithm depends on the method of generating the ambient noise parameter. During stage S320 the flow proceeds to stage S402 of flowchart 400.

Figure 4:
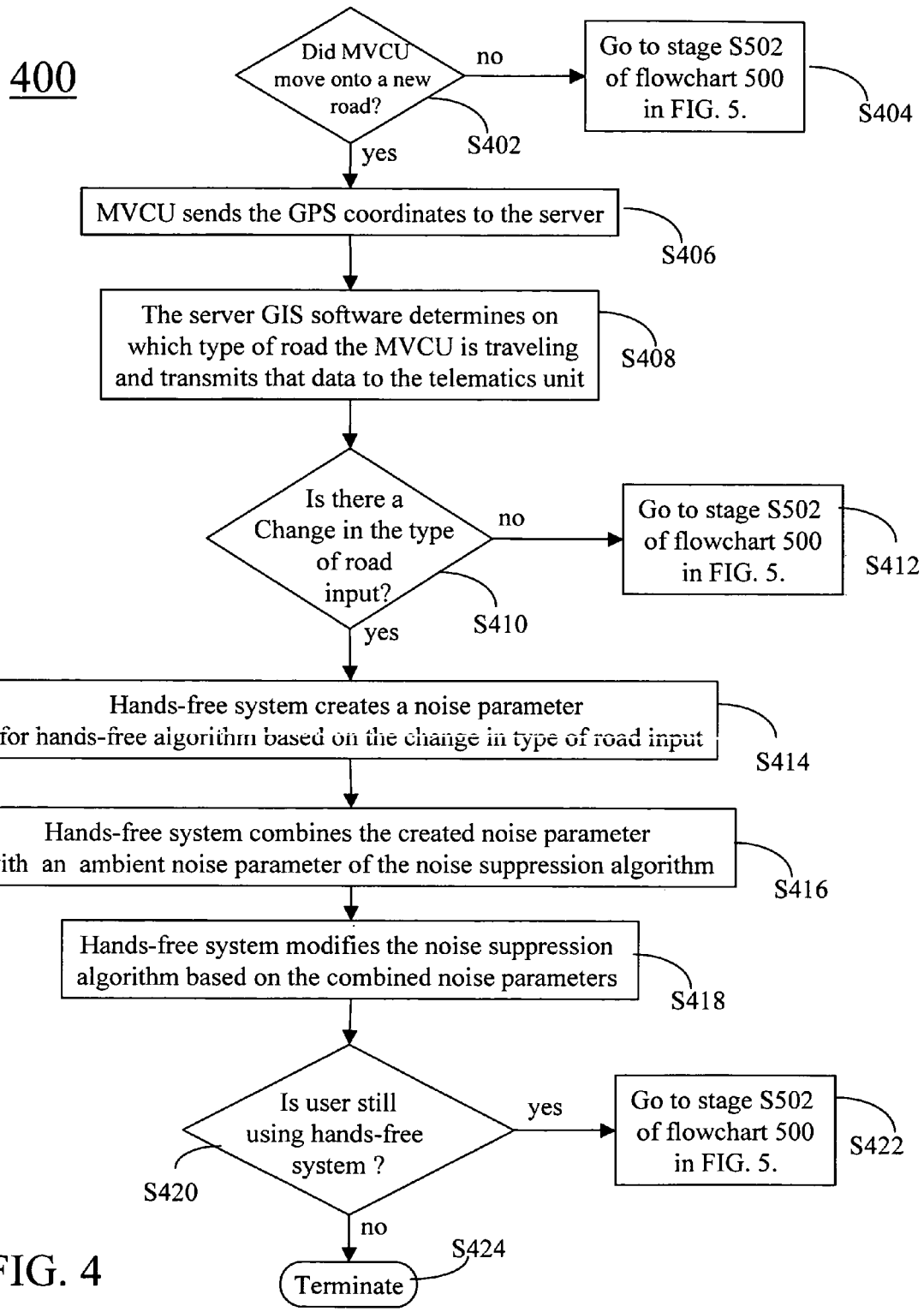
FIG. 4 illustrates a flowchart representative of modifying a type of road input to modify a noise parameter and a noise suppression algorithm in accordance with the present invention.

FIG. 4 illustrates a flowchart 400 representative of modifying a type of road input to modify a noise parameter and a noise suppression algorithm in accordance with the present invention.

During stage S402, it is determined if the MVCU 110 has moved onto a new road. The GPS unit 126 in the telematics unit 120 determines if the road has changed. If it is determined during stage S402 that MVCU 110 is on the same road, the flow proceeds to stage S404. During stage S404, the flow proceeds to stage S502 of flowchart 500 in FIG. 5.

If it is determined during stage S402 that MVCU 110 has moved to a new road, the flow proceeds to stage S406. During stage S406, the MVCU 100 sends the global positioning system (GPS) coordinates to the server. The global positioning system (GPS) unit 126 in telematics unit 120 transmits the GPS coordinates through the DSP 122, the vehicle communication bus 112 to the communications network, comprising at least one of the wireless carrier system 140, the communication network 142 and land network 144. The GPS coordinates are transmitted over the communication network to one or more communication services databases 176 at the call center 170.

During stage S408, geographic information systems (GIS) software, which is part of the communication services database 176, is used to determine on which type of road MVCU 110 is traveling and transmits that data to the telematics unit 120 using at least one of the wireless carrier system 140, the communication network 142 and land network 144. During stage S410, it is determined if there is a change in the type of road input. The previous type of road will be retrieved by DPS 122 from memory 128 and compared to the new type of road input transmitted from the communication services database 176 during stage S408. The new type of road input received from the communication services database 176 will be input to memory 128. In another embodiment, the GIS software resides locally within telematics unit 120 in a section of memory 128. The new type of road input determine will be placed in another section of memory 128.

If it is determined that there is no change in the type of road input, the flow proceeds to stage S412. During stage S412, the flow proceeds to stage S402 of flowchart 400. If it is determined that there is a change in the type of road input, the flow proceeds to stage S414.

During stage S414, the hands-free system creates a noise parameter for hands-free algorithm based on the change in type of road input. Each type of road input has a related noise parameter, which is used to create the noise parameter. The type of road noise parameter will vary with vehicle brand and model. During stage S416 the hands-free system combines the created noise parameter with an ambient noise parameter of the noise suppression algorithm. The manner in which the noise parameters are combined depends upon the manner in which the ambient noise parameter is formed.

During stage S418, the hands-free system modifies the noise suppression algorithm based on the combined parameters. The method of modifying the noise suppression algorithm depends on the method of generating the ambient noise parameter. During stage S420, it is determined if the user is still using the hands-free algorithm. In one embodiment, the DSP 122 checks if the embedded or in-vehicle phone 132 is connected to an open communication channel to determine if the user is still using the hands-free algorithm. If it is determined, during stage S420, that the hands-free algorithms is still in use, the flow proceeds to stage S422. During stage S422, the flow proceeds to stage S502 of flowchart 500 in FIG. 5. If it is determined, during stage S420, that the hands-free algorithm is not still in use, the flow proceeds to stage S424. During stage S424, the flow terminates.

Figure 5:
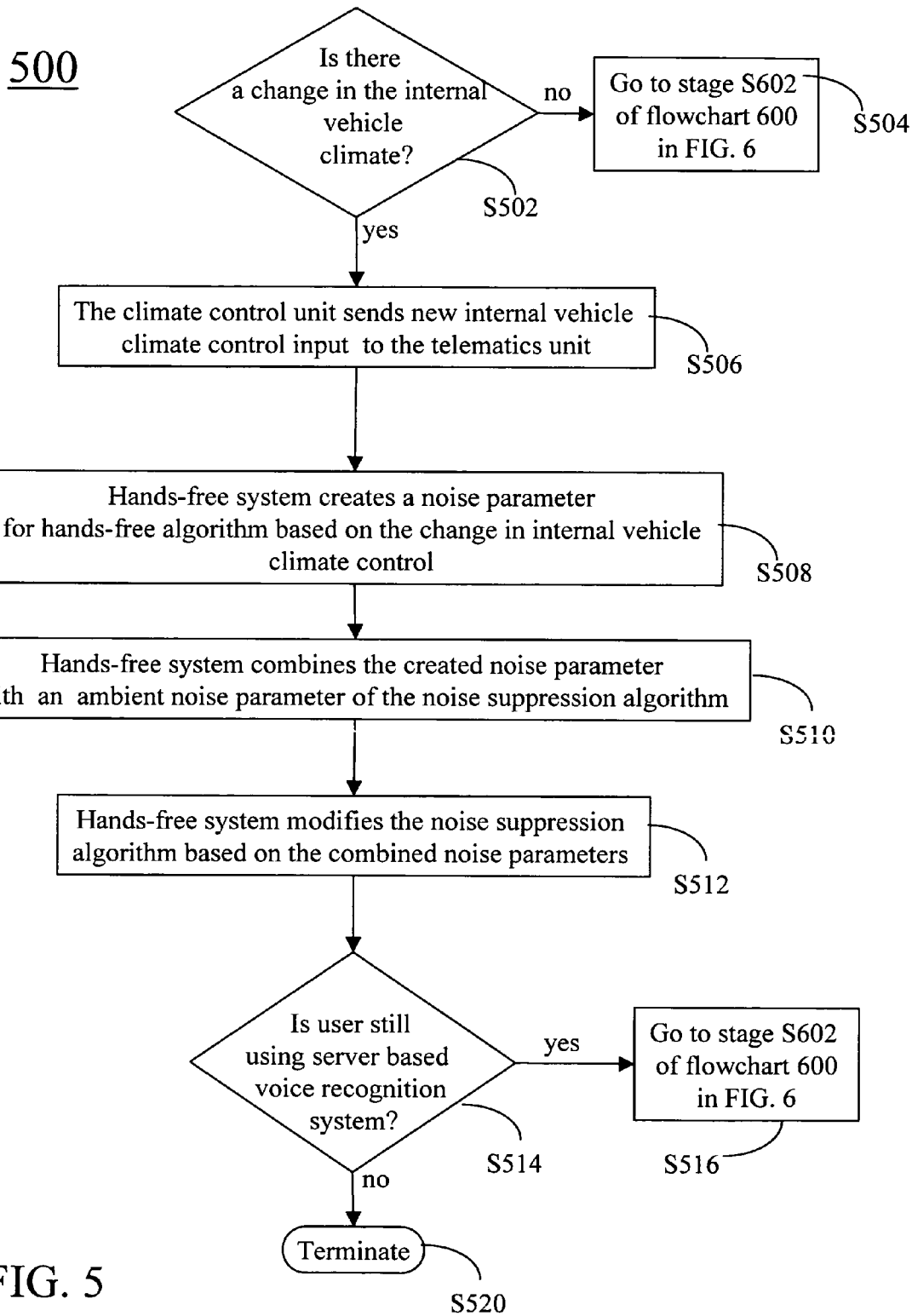
FIG. 5 illustrates a flowchart representative of modifying an internal climate control input to modify a noise parameter and a noise suppression algorithm in accordance with the present invention.

FIG. 5 illustrates a flowchart 500 representative of modifying an internal climate control input to modify a noise parameter and a noise suppression algorithm in accordance with the present invention.

During stage S502, it is determined if there is a change in the internal vehicle climate. The DSP 122 monitors the fans, which control the internal climate for changes that will affect the noise level in MVCU 110. If it is determined, during stage S502, that the internal vehicle climate has not changed since the last internal vehicle climate modification to the input parameter of the hands-free algorithm, the flow proceeds to stage S504. During stage S504, the flow proceeds to stage S602 of flowchart 600 in FIG. 6.

If it is determined, during stage S502, that the internal vehicle climate has changed since the last internal vehicle climate modification to the input parameter of the hands-free algorithm, the flow proceeds to stage S506. During stage S506, the climate control unit sends the new internal vehicle climate control input to the telematics unit 120. The climate control unit within MVCU 110 receives multiple inputs from fans and applies an algorithm to combine them into a single climate control input parameter. Then the climate control unit transmits the single climate control input parameter to the DSP 122 in the telematics unit 120. In an alternative embodiment the climate control unit receives multiple input from fans and transmits the multiple input from fans to the DSP 122 in the telematics unit 120. Then the DSP 122 applies an algorithm to combine them into a single climate control input parameter.

During stage S508, the hands-free system creates a noise parameter for hands-free algorithm based on the change in internal vehicle climate control after the DSP communicates the climate control input parameter to the hands-free algorithm in the embedded or in-vehicle mobile phone 134.

During stage S510 the hands-free system combines the created noise parameter with an ambient noise parameter of the noise suppression algorithm. The manner in which the noise parameters are combined depends upon the manner in which the ambient noise parameter is formed.

During stage S512, the hands-free system modifies the noise suppression algorithm based on the combined noise parameters. The method of modifying the noise suppression algorithm depends on the method of generating the ambient noise parameter.

During stage S514, it is determined if the user is still using the hands-free algorithm. In one embodiment, the DSP 122 checks if the embedded or in-vehicle phone 132 is connected to an open communication channel to determine if the user is still using the hands-free algorithm. If it is determined, during stage S514, that the hands-free algorithm is still in use, the flow proceeds to stage S516. During stage S516, the flow proceeds to stage S602 of flowchart 600 in FIG. 6. If it is determined, during stage S514, that the hands-free algorithm is not still in use, the flow proceeds to stage S520. During stage S520, the flow terminates.

Figure 6:
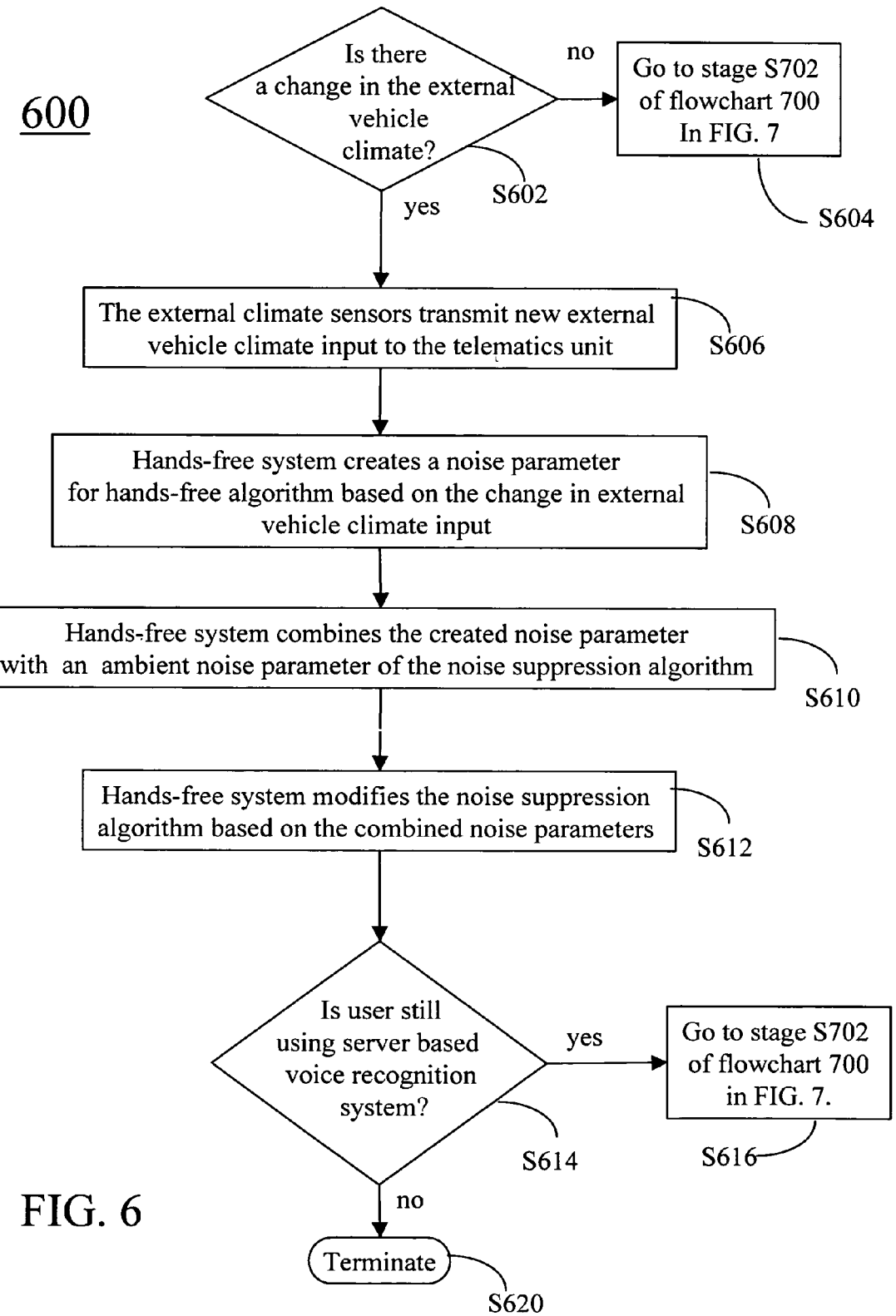
FIG. 6 illustrates a flowchart representative of modifying an external vehicle climate input to modify a noise parameter and a noise suppression algorithm in accordance with the present invention.

FIG. 6 illustrates a flowchart 600 representative of modifying an external vehicle climate input to modify a noise parameter and a noise suppression algorithm in accordance with the present invention.

During stage S602, it is determined if there is a change in the external vehicle climate. The DSP 122 monitors the external climate sensors 136 for changes that will affect the noise level in MVCU 110. The external climate sensors 136 include wind and rain sensors 136. If it is determined that the external vehicle climate has not changed since the last external vehicle climate modification to the input parameter of the hands-free algorithm, the flow proceeds from stage S602 to stage S604. During stage S604, the flow proceeds to stage S702 of flowchart 700 in FIG. 7.

If it is determined that the external vehicle climate has changed since the last external vehicle climate modification to the input parameter of the hands-free algorithm, the flow proceeds from stage S602 to stage S606. During stage S606, the external climate sensors 136 transmit the new external vehicle climate control input to the DSP 122 of the telematics unit 120. Then the DSP 122 applies an algorithm to combine all the inputs into a single external climate input parameter.

During stage S608, the hands-free system creates a noise parameter for hands-free algorithm based on the change in external vehicle climate input after the DSP 122 communicates the climate control input parameter to the hands-free algorithm in the embedded or in-vehicle mobile phone 134.

During stage S610 the hands-free system combines the created noise parameter with an ambient noise parameter of the noise suppression algorithm. The manner in which the noise parameters are combined depends upon the manner in which the ambient noise parameter is formed.

During stage S612, the hands-free system modifies the noise suppression algorithm based on the combined noise parameters. The method of modifying the noise suppression algorithm depends on the method of generating the ambient noise parameter.

During stage S614, it is determined if the user is still using the hands-free algorithm. In one embodiment, the DSP 122 checks if the embedded or in-vehicle phone 132 is connected to an open communication channel to determine if the user is still using the hands-free algorithm. If it is determined, during stage S614, that the hands-free algorithm is still in use, the flow proceeds to stage S616. During stage S616, the flow proceeds to stage S702 of flowchart 700 in FIG. 7. If it is determined, during stage S614, that the hands-free algorithm is not still in use, the flow proceeds to stage S620. During stage S620, the flow terminates.

Figure 7:
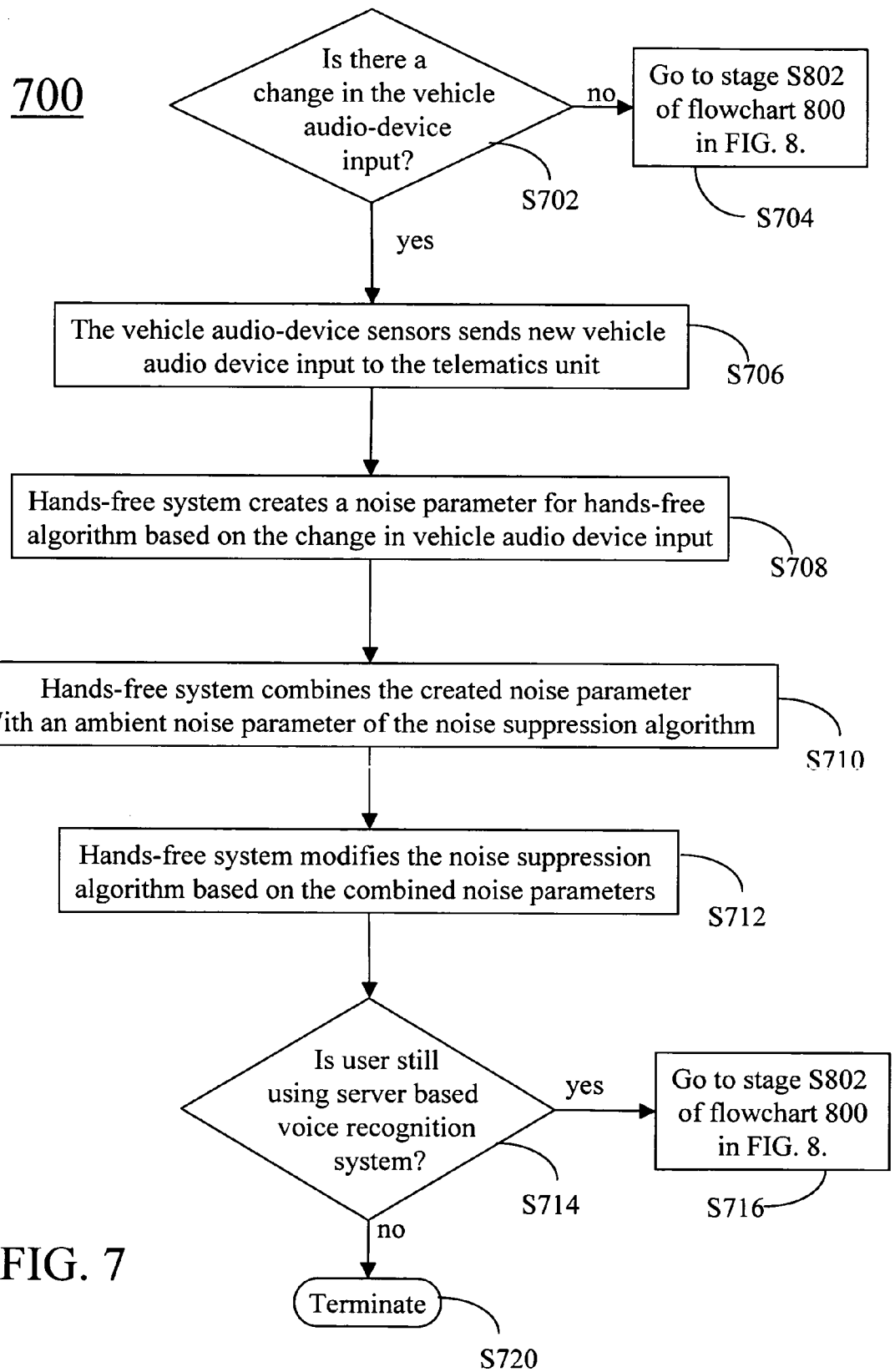
FIG. 7 illustrates a flowchart representative of modifying a vehicle audio-device input to modify a noise parameter and a noise suppression algorithm in accordance with the present invention.

FIG. 7 illustrates a flowchart 700 representative of modifying a vehicle audio-device input to modify a noise parameter and a noise suppression algorithm in accordance with the present invention.

During stage S702, it is determined if there is a change in the level of sound emitted by any of the vehicle audio-devices in the MVCU 110. The DSP 122 monitors sensors 136 embedded in the audio devices for changes that will affect the noise level in MVCU 110. If it is determined that the level of sound emitted by the vehicle audio-devices in the MVCU 110 has not changed since the last vehicle audio-device modification to the input parameter of the hands-free algorithm, the flow proceeds from stage S702 to stage S704. During stage S704, the flow proceeds to stage S802 of flowchart 800 in FIG. 8.

If it is determined that the level of sound emitted by any of the vehicle audio-devices in the MVCU 110 has changed since the last vehicle audio-device modification to the input parameter of the hands-free algorithm, the flow proceeds from stage S702 to stage S706. During stage S706, the audio vehicle device sensors 136 transmit the audio vehicle device input to the DSP 122 of the telematics unit 120. The audio vehicle device sensors 136 within MVCU 110 input the level of sound to the DSP 122. Then the DSP 122 applies an algorithm to combine all the inputs into a single audio vehicle device input parameter.

During stage S708, the hands-free system creates a noise parameter for hands-free algorithm based on the change in audio vehicle device input parameter after the DSP communicates the audio vehicle device input parameter to the hands-free algorithm in the embedded or in-vehicle phone 134.

During stage S710 the hands-free system combines the created noise parameter with an ambient noise parameter of the noise suppression algorithm. The manner in which the noise parameters are combined depends upon the manner in which the ambient noise parameter is formed.

During stage S712, the hands-free system modifies the noise suppression algorithm based on the combined noise parameters. The method of modifying the noise suppression algorithm depends on the method of generating the ambient noise parameter.

During stage S714, it is determined if the user is still using the hands-free algorithm. In one embodiment, the DSP 122 checks if the embedded or in-vehicle phone 132 is connected to an open communication channel to determine if the user is still using the hands-free algorithm. If it is determined, during stage S714, that the hands-free algorithm is still in use, the flow proceeds to stage S716. During stage S716, the flow proceeds to stage S802 of flowchart 800 in FIG. 8. If it is determined, during stage S714, that the hands-free algorithm is not still in use, the flow proceeds to stage S720. During stage S720, the flow terminates.

Figure 8:
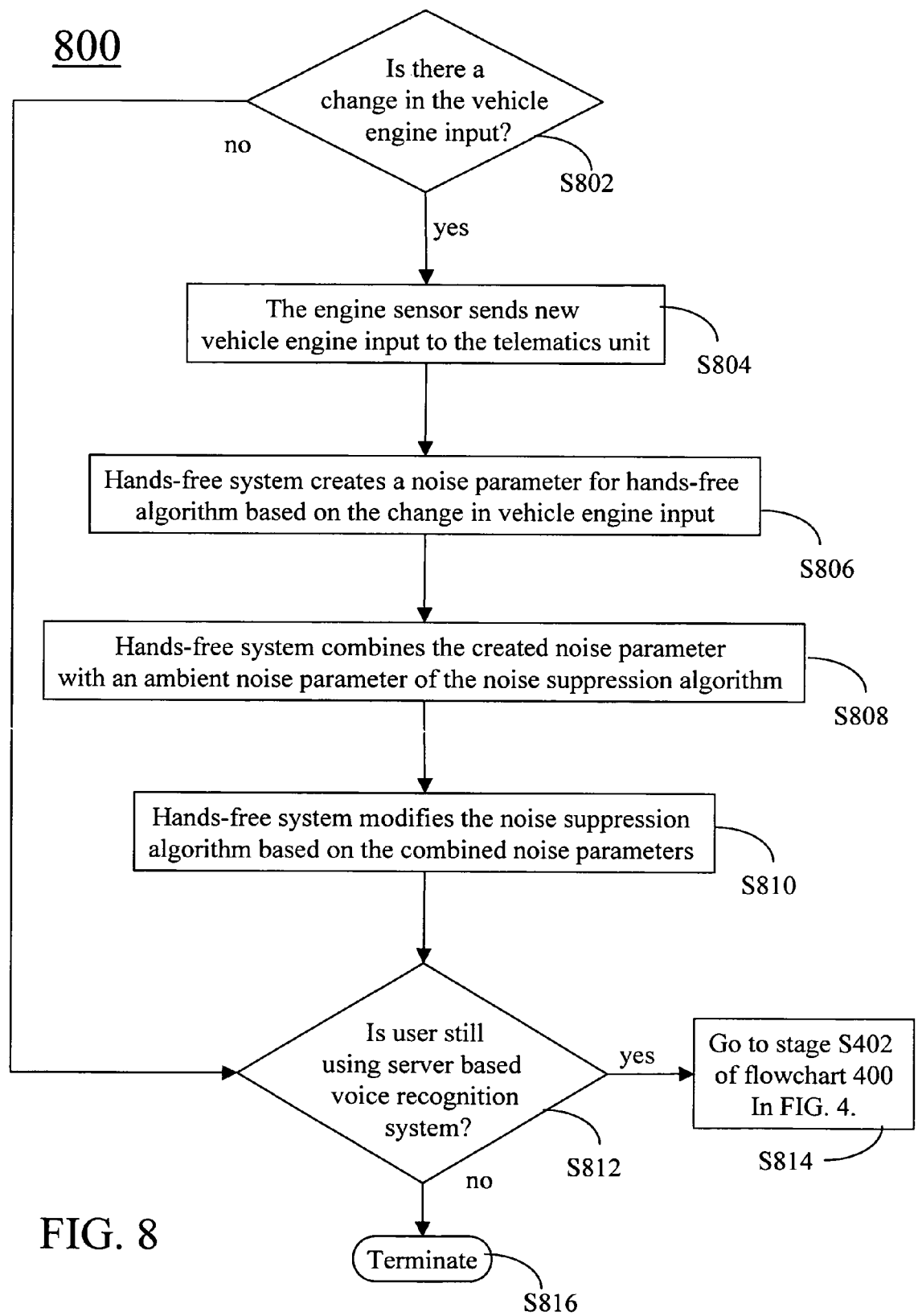
FIG. 8 illustrates a flowchart representative of modifying a vehicle engine input to modify a noise parameter and a noise suppression algorithm in accordance with the present invention.

FIG. 8 illustrates a flowchart 800 representative of modifying a vehicle engine input to modify a noise parameter and a noise suppression algorithm in accordance with the present invention.

During stage S802, it is determined if there is a change in the level of sound emitted by any of the vehicle engine components in the MVCU 110. The DSP 122 monitors one or more sensors 136 embedded in the engine for changes that will affect the noise level in MVCU 110. If it is determined that there is not change in the level of sound inside MVCU 110 due to a change in a component in the vehicle engine of the MVCU 110, the flow proceeds from stage S802 to stage S812. During stage S812, it is determined if the user is still using the hands-free algorithm. If it is determined, during stage S812, that the hands-free algorithm is still in use, the flow proceeds to stage S814. During stage S814, the flow proceeds to stage S402 of flowchart 400 in FIG. 4.

If it is determined, during stage S812, that the hands-free algorithm is not still in use, the flow proceeds to stage S816. During stage S816, the flow terminates.

If it is determined that the level of sound emitted by any of the components in the vehicle engine in the MVCU 110 has changed since the last vehicle engine input modification to the input parameter of the hands-free algorithm, the flow proceeds from stage S802 to stage S804. During stage S804, the sensors 136 embedded in the engine transmit vehicle engine input to the DSP 122 of the telematics unit 120. The sensors 136 embedded in the engine of the MVCU 110 input the level of sound to the DSP 122. Then the DSP 122 applies an algorithm to combine all the inputs into a single vehicle engine input parameter.

During stage S806, the hands-free system creates a noise parameter for hands-free algorithm based on the change in vehicle engine input parameter after the DSP communicates the audio vehicle device input parameter to the hands-free algorithm in the embedded or in-vehicle phone 134.

During stage S808 the hands-free system combines the created noise parameter with an ambient noise parameter of the noise suppression algorithm. The manner in which the noise parameters are combined depends upon the manner in which the ambient noise parameter is formed.

During stage S810, the hands-free system modifies the noise suppression algorithm based on the combined noise parameters. The method of modifying the noise suppression algorithm depends on the method of generating the ambient noise parameter.

During stage S812, it is determined if the user is still using the hands-free algorithm. In one embodiment, the DSP 122 checks if the embedded or in-vehicle phone 132 is connected to an open communication channel to determine if the user is still using the hands-free algorithm. If it is determined, during stage S812, that the hands-free algorithm is still in use, the flow proceeds to stage S814. During stage S814, the flow proceeds to stage S402 of flowchart 400 in FIG. 4. If it is determined, during stage S812, that the hands-free algorithm is not still in use, the flow proceeds to stage S816. During stage S816, the flow terminates.

The flowcharts 400, 500, 600, 700 and 800 describe a method of taking one change in input data and creating a modified noise parameter for the hands-free noise algorithm before checking the next sensor 136 for a change in input. In an alternative embodiment, the hands-free system 133 collects a change in the data from all the sensors before creating a noise parameter for the hands-free algorithm base on all the changes in the input data.

The above-described methods and implementation for dynamic tuning by a hands-free algorithm within a telematics equipped MVCU are example methods and implementations. These methods and implementations illustrate one possible approach for enhancing the hands-free system within a telematics equipped mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of tuning a hands-free system in a mobile vehicle, the method comprising:
    receiving a plurality of vehicle condition inputs, including at least one road input based on global positioning coordinates, via a vehicle communication bus;
    creating a noise parameter based on the vehicle condition inputs; and
    adjusting a noise suppression algorithm of the hands-free system based on the created noise parameter;
    wherein the road input is received from a call center using at least one of the group consisting of a wireless carrier system, a communication network and a land network.

2. A method of tuning a hands-free system in a mobile vehicle, the method comprising:
    determining if the mobile vehicle has moved onto a new road based on a GPS location;
    sending the GPS location to a call center based on the determination;
    receiving a road input from the call center in response to the sending; and
    adjusting a noise parameter for the hands-free system based on the received road input.

3. The method of claim 2 further comprising adjusting the noise suppression algorithm in response to at least one of the group consisting of an internal vehicle climate, an external vehicle climate, an audio-device modification, a change in the level of sound emitted by a vehicle engine component, an internal vehicle condition, and an external vehicle condition.

4. The method of claim 2 wherein the road input is received from the call center using at least one of the group consisting of a wireless carrier system, a communication network and a land network.

5. A method of tuning a hands-free system in a mobile vehicle, the method comprising:

receiving a GPS location from the mobile vehicle at a call center;

determining a road input based on the received GPS location and a geographic information systems database; and sending the road input from the call center to the mobile vehicle.

6. The method of claim 5 wherein the road input is received from the call center using at least one of the group consisting of a wireless carrier system, a communication network and a land network.

* * * * *